(12) United States Patent
Chang et al.

(10) Patent No.: US 9,105,275 B2
(45) Date of Patent: Aug. 11, 2015

(54) METHOD FOR SENSING THE PHYSICALLY-RECORDABLE MAXIMUM CAPACITY OF A DISC

(71) Applicants: Shuo Wei Chang, Monterey Park, CA (US); David R. Guo, Temple City, CA (US)

(72) Inventors: Shuo Wei Chang, Monterey Park, CA (US); David R. Guo, Temple City, CA (US)

(73) Assignee: Vinpower, Inc., Alhambra, CA (US)

( * ) Notice: Subject to any disclaimer, the term of this patent is extended or adjusted under 35 U.S.C. 154(b) by 55 days.

(21) Appl. No.: 14/309,768

(22) Filed: Jun. 19, 2014

(65) Prior Publication Data
US 2015/0098312 A1    Apr. 9, 2015

(30) Foreign Application Priority Data

Oct. 8, 2013 (TW) .............................. 102136268 A

(51) Int. Cl.
*G11B 7/007* (2006.01)
*G11B 20/12* (2006.01)

(52) U.S. Cl.
CPC .. *G11B 7/00736* (2013.01); *G11B 2007/00754* (2013.01); *G11B 2020/1232* (2013.01)

(58) Field of Classification Search
None
See application file for complete search history.

(56) References Cited

U.S. PATENT DOCUMENTS 6,963,526 B2 * 11/2005 Takemoto et al. ......... 369/53.29
7,061,841 B2 *  6/2006 Chiba et al. ............... 369/53.15

* cited by examiner

*Primary Examiner* — Brenda Bernardi
(74) *Attorney, Agent, or Firm* — Jen-Feng Lee, Esq.

(57) ABSTRACT

The method adapted for a disc burner for sensing/computing the maximum allowable capacity of a disc for overburn purpose where an accurate capacity of the disc based on the outermost-edge wobble signal is obtained, resulting in more data written on the disc with an amount of the data smaller than the physically-recordable maximum capacity of the disc and decreasing the failure rate of data overburning.

4 Claims, 6 Drawing Sheets

|  | DESCRIPTION | RADIUS | PHYSICAL SECTOR NUMBER OF FIRST PHYSICAL SECTOR | AMOUNT OF PHYSICAL SECTOR |
|---|---|---|---|---|
| LEAD-IN AREA | START ZONE | START FROM 22.000mm | (01F2B0) | 47488UNITS |
|  | INNER DISC TEST ZONE | START FROM 23.397mm | (02AC80) | 12288 |
|  | GUARD ZONE 1 | START FROM 23.746mm | (02DC80) | 512 |
|  | RESERVED ZONE 1 |  | (02DE80) | 4096 |
|  | RESERVED ZONE 2 |  | (02EE80) | 46 |
|  | INNER DISC ID ZONE |  | (02EEC0) | 256 |
|  | RESERVED ZONE 3 |  | (02EFC0) | 64 |
|  | REFERENCE CODE ZONE | START FROM 23.886mm | (02F000) | 32 |
|  | BUFFER ZONE 1 |  | (02F020) | 480 |
|  | CONTROL DATA ZONE |  | (02F200) | 3072 |
|  | BUFFER ZONE 2 |  | (02FE00) | 512 |
| Data Area | DATA | START FROM 24.000mm | (030000) | AT MOST 2086912 |
| MIDDLE AREA | BUFFER ZONE 3 | START FROM 58.000mm | AT MOST (22D800) | 768 |
|  | Reserved Zone 4 |  | AT MOST (22DB00) | 256 |
|  | GUARD ZONE 2 |  | AT MOST (22DC00) | AT LEAST 4096 |
| OUTER DRIVE AREA | RESERVED ZONE 5 | START FROM 58.059mm | (22EC00) | 4096 |
|  | OUTER DISC TEST ZONE | START FROM 58.106mm | (22FC00) | 12288 |

FIG. 4

METHOD FOR SENSING THE PHYSICALLY-RECORDABLE MAXIMUM CAPACITY OF A DISC

FOREIGN PRIORITY CLAIM

The present invention claims the foreign priority of a Taiwanese application, number 102136268, having priority date of Oct. 8, 2013. A certified copy is attached herein.

FIELD AND BACKGROUND OF THE INVENTION

The present invention relates to a method for sensing a capacity of a disc, and more particularly to a method adapted for a disc burner for sensing a recordable maximum capacity of a disc held in the disc burner when overburn functionality is desired.

DESCRIPTION OF RELATED ART

Optical discs such as CDs and DVDs are widely used nowadays. Data can be easily copied to a disc with a computer having a disc burner and disc burning software. A user can also copy a disc with a standalone duplicator by disc burning software installed in the standalone duplicator.

Data burned to a disc are burned to the tracks, which are separated into a Lead-in Area, a Data Area and a Lead-out Area, wherein disc specification information such as the disc type and the capacity of the disc are previously written on the tracks in the Lead-in Area.

Referencing FIG. 5, a dual layer disc has a first layer 40 and a second layer 50 for sequentially storing data. A Lead-in Area 41 and a Lead-out Area 51 of the dual layer disc are respectively on the first layer 40 and the second layer 50, wherein the first layer 40 and the second layer 50 each have a Data Area 42, 52, a Middle Area 43, 53 and an Outer Drive Area 44, 54.

Data burning on a dual layer disc usually will go from the first layer and then cross to the second layers 40, 50. Two Middle Areas 43, 53, respectively for the two Data Areas 42, 52, are used to assist the data burning crossing from the first layer 40 to the second layer 50. Two Outer Drive Areas 44, 54, each respectively for one layer of the burned data, are disc testing of the dual layer disc.

Disc burning software installed in a disc burner controls a processor of the disc burner to sense a capacity of a disc before data burning With reference to FIG. 6, a conventional method for sensing the capacity of the disc is executed by the processor of the disc burner and has steps of:

receiving an inquiry instruction from the disc burning software 501;

reading standard capacity from a Lead-in Area of the disc in the disc burner 502; and, responding to the inquiry instruction with the standard capacity 503.

Generally, the amount of total recordable data of the disc is reflected by the standard capacity of the disc previously written on the tracks in the Lead-In area.

However, data can also be stored in the two Middle Areas 43, 53, thus, the recordable amount of data of the disc is actually higher than the standard capacity. Some disc burning software contain an overburn function to take advantage of these two Middle Areas being used for burning data.

The overburn function of the conventional disc burning software reads the standard capacity from the Lead-in Area of the disc in the disc burner, and then it adds certain overburn capacity to obtain a maximum allowable burn capacity.

The conventional disc burning software with the overburn function controls the disc burner to write data of the disc with an amount of the data that is smaller than the maximum allowable burn capacity. However, Middle Areas 43, 53 of different discs have different amounts of tracks for overburning. Sometimes the overburn function actually writes more data to the disc than is actually allowed, when there is no reliable information about the capacity of the Middle Areas 43 and 53. Therefore, the data overburning may fail due to a shortage of the capacity of the disc.

SUMMARY OF THE INVENTION

The main objective of the invention is to provide a method adapted for a disc burner for sensing a physically-recordable maximum capacity of a disc held in the disc burner.

The method for sensing a physically-recordable maximum capacity of a disc has steps of:

receiving an inquiry instruction for sensing a physically-recordable maximum capacity of a disc;

sensing wobble signals detected from a disc held in the disc burner;

obtaining an outermost-edge wobble signal of the disc;

computing the physically-recordable maximum capacity of the disc based on the outermost-edge wobble signal; and, responding to the inquiry instruction with the physically-recordable maximum capacity being computed.

The method in accordance with the present invention can be adapted for a disc burner to compute physically-recordable maximum capacity of a disc in the disc burner by sensing an outermost-edge wobble signal of the disc. When disc burning software installed in the disc burner utilizes the method to compute the physically-recordable maximum capacity, data burning can be assured to process an amount of the data that is smaller than the physically-recordable maximum capacity of the disc to decrease a failure rate of data overburning.

BRIEF DESCRIPTION OF THE DRAWINGS

FIG. 4 is a table of specification of areas on a dual layer disc;

DETAILED DESCRIPTION OF THE PREFERRED EMBODIMENTS

Figure 1:
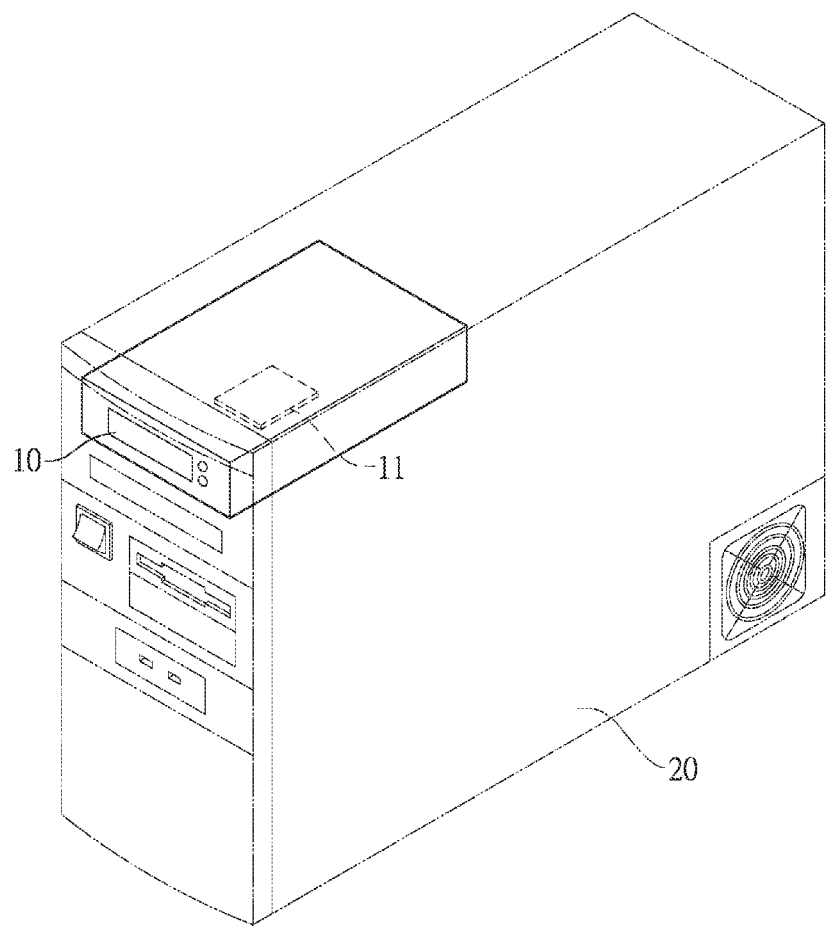
FIG. 1 is a perspective view of a disc burner using a method for sensing a physically-recordable maximum capacity of a disc in accordance with the present invention and mounted in a computer.
Figure 2:
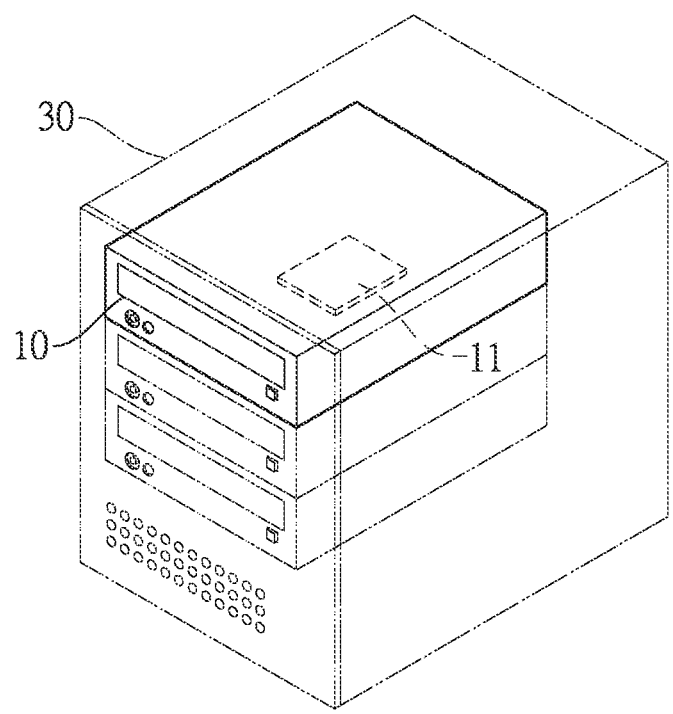
FIG. 2 is a perspective view of a disc burner using a method for sensing a physically-recordable maximum capacity of a disc in accordance with the present invention and mounted in a duplicator.

A method for sensing a physically-recordable maximum capacity of a disc in accordance with the present invention is adapted for a disc burner. With reference to FIGS. 1 and 2, the disc burner 10 can be mounted in a computer 20 or a duplicator 30, wherein the computer 20 and the duplicator 30 are both installed with disc burning software. The disc burner 10 has a processor 11.

Figure 3:
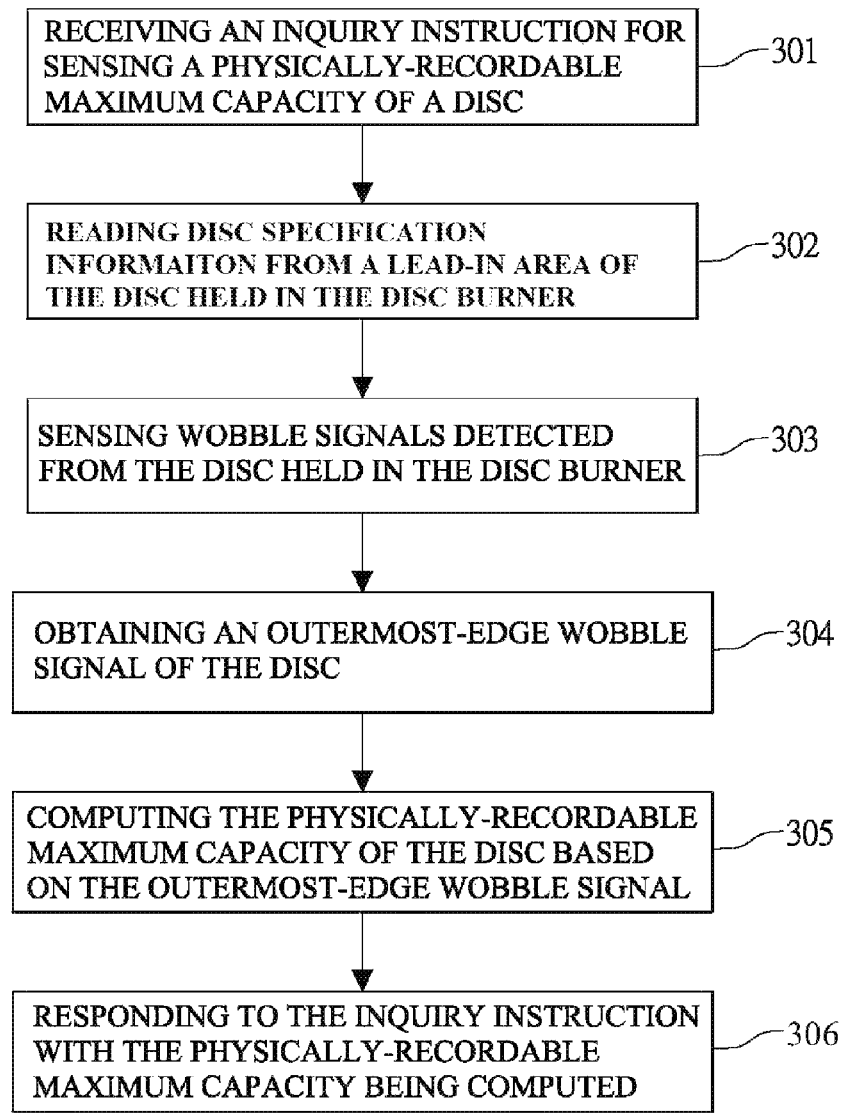
FIG. 3 is a flowchart of a method for sensing a physically-recordable maximum capacity of a disc in accordance with the present invention.
Figure 5:
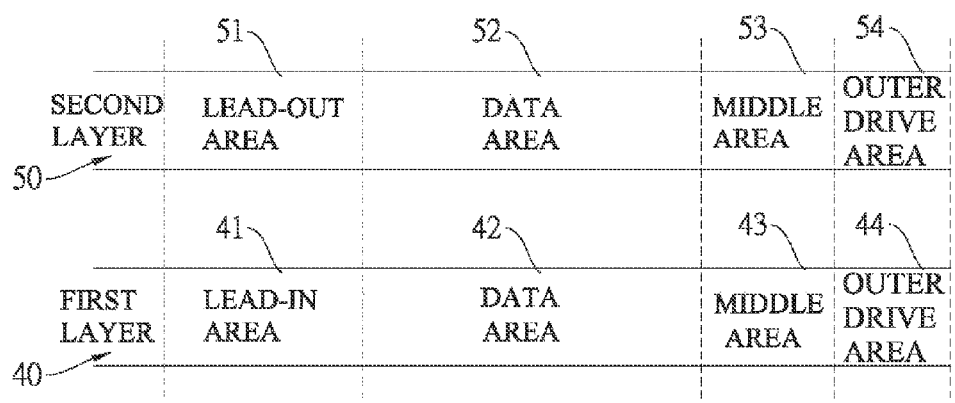
FIG. 5 is a flowchart of a conventional method for sensing an physically-recordable maximum capacity of a disc.
Figure 6:
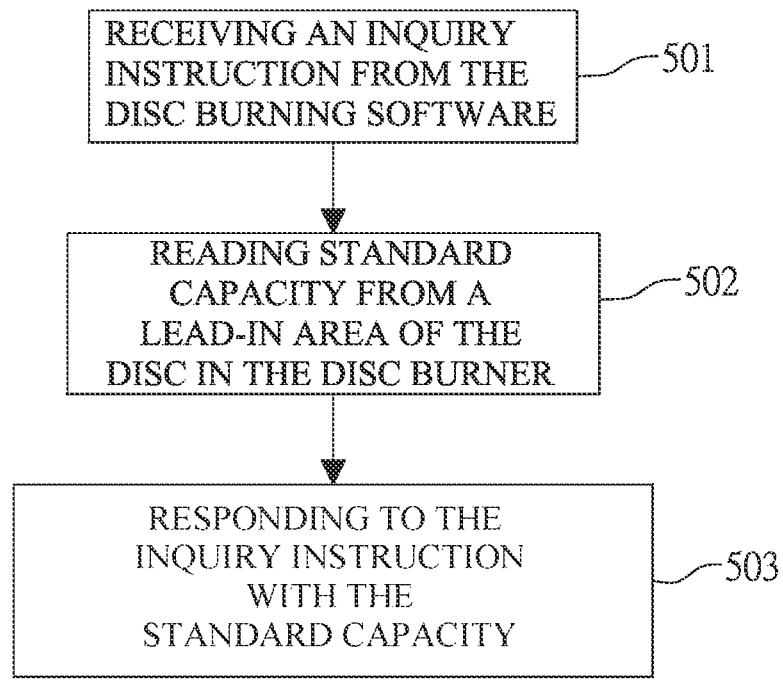
FIG. 6 is a schematic diagram showing areas on a dual layer disc.

With reference to FIG. 3, the method for sensing a physically-recordable maximum capacity of a disc in accordance with the present invention is executed by the processor 11 of the disc burner 10 and has the following steps.

Step 301: Receiving an inquiry instruction for sensing a physically-recordable maximum capacity of a disc.

Step 302: reading disc specification information from a Lead-in Area of the disc held in the disc burner.

Step 303: Sensing wobble signals detected from a disc held in the disc burner 11.

Step 304: Obtaining an outermost-edge wobble signal of the disc.

Step 305: Computing the physically-recordable maximum capacity of the disc based on the outermost-edge wobble signal.

Step 306: Responding to the inquiry instruction with the physically-recordable maximum capacity being computed.

In Step 301, the disc burner 10 receives the inquiry instruction from disc burning software.

In Step 302, the disc burner 10 reads the disc specification information from a Lead-in Area of the disc. Taking a DVD+R dual layer disc for example, the dual layer disc has a first layer 40 and a second layer 50. With reference to FIG. 4, the first layer 40 has a Lead-in Area 41, a Data Area 42, a Middle Area 43 and an Outer Drive Area 44. The second layer 50 has a Lead-out Area 51, a Data Area 52, a Middle Area 53 and an Outer Drive Area 54.

The disc specification information is written in the Lead-in Area 41 and includes physical sector number information of the Lead-in Area 41, the Data Areas 42/52, the Middle Areas 43/53, the Outer Drive Areas 44/54 and the Lead-out Area 51.

In the execution of step 302, the disc burner 10 further obtains a start physical sector number of the Data Area 42 in the first layer 40.

A disc has multiple tracks to store data by writing the data in the tracks. The tracks of the disc are wavy, and each track of the disc has a middle line and multiple wavy edges, wherein the data is written on the middle line. The disc burner 10 continuously senses a frequency of the wobbles of the wavy edges of the tracks, and obtains a wobble signal based on the frequency of the wobbles of the wavy edges of the tracks. The disc burner 10 compares the wobble signal with the physical sector numbers to confirm whether a current reading point is in the Lead-in Area 41, the Data, Area 42 or the Lead-out Area 52 of the disc.

The tracks are formed in the direction of going from an innermost ring of the disc to an outermost ring of the disc; the disc burner 10 also senses the disc from the innermost tracks to the outermost tracks.

The Lead-in Area 41 and the Lead-out Area 51 of a dual layer disc, such as DVD+R or DVD+RW, are respectively on a first layer and a second layer of the dual layer disc. Some disc burning software allows a layer break point to be set by users/programmers, wherein data burning process on the first layer will stop at the layer break point, and resume on the second layer after the layer break point. Taking the DVD+R dual layer disc for example, the Middle Areas 43/53 and the Outer Drive Areas 44/54 between the layer break point and Data Areas 42/52 of the DVD+R dual layer disc can be used for additional area of data burning, i.e, overburning. Therefore, the layer break point can be set near an outermost edge of the first layer, which is also an outermost edge of the Outer Drive Area, to expand a capacity of the DVD+R dual layer disc.

In the step 303, the wobble signals begin to be detected at a last physical sector of the Data Area of the disc, that is, the wobble signals begin to be detected after a last physical sector number of the Data Area (0x22D800) is detected by the disc burner 10.

In Step 304, take the DVD+R dual layer disc for example, wherein the outermost edge wobble signal is defined as a last wobble signal detected at a last physical sector of the Outer Drive Area, of the first layer of the DVD+R dual layer disc after the last physical sector number of the Data Area (0x22D800) of the first layer of the DVD+R dual layer disc is detected.

In Step 305, the processor 11 computes the physically-recordable maximum capacity of the disc based on the outermost-edge wobble signal from the Outer Drive Area. If the disc held in the disc burner 10 is a DVD+R single layer disc, the computed physically-recordable capacity of the disc based on the outermost-edge wobble signal from the Outer Drive Area is the physically-recordable maximum capacity of the disc. If the disc held in the disc burner 10 is a DVD+R dual layer disc, the physically-recordable maximum capacity of the disc should be the computed physically-recordable capacity of the disc based on the outermost-edge wobble signal from the Outer Drive Area multiplied by two.

The disc burner 10 outputs the physically-recordable maximum capacity of the disc to the disc burning software, wherein the physically-recordable maximum capacity is regarded as a response to the inquiry instruction of the disc burning software.

By the method for sensing a physically-recordable maximum capacity of a disc in accordance with the present invention, the disc burner 10 obtains more accurate capacity of a disc based on an outermost-edge wobble signal. When the disc is a dual layer disc such as DVD+R or DVD+RW, a user can obtain the physically-recordable maximum capacity in light of the feature where DVD+R or DVD+RW dual layer disc allowing the user to set the layer break point on the dual layer disc.

As discussed herein, by the method for sensing a physically-recordable maximum capacity of a disc in accordance with the present invention, the disc burner 10 mounted in the computer 20 or the standalone duplicator 30 obtains a physically-recordable maximum capacity of a disc based on an outermost-edge wobble signal and responds with the physically-recordable maximum capacity to the inquiry instruction of the disc burning software. Therefore, data can be written, when overburn feature is activated, on the disc with an amount of the data smaller than the physically-recordable maximum capacity of the disc to decrease a failure rate of data overburning.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A method adapted for a disc burner for sensing a physically-recordable maximum capacity of a disc, the method comprising steps of:

receiving an inquiry instruction for sensing a physically-recordable maximum capacity of a disc;

sensing wobble signals detected from a disc held in the disc burner;

obtaining an outermost-edge wobble signal of the disc;
computing the physically-recordable maximum capacity of the disc based on the outermost-edge wobble signal; and
responding to the inquiry instruction with the physically-recordable maximum capacity being computed.

2. The method as claimed in claim 1, wherein
after the step of receiving an inquiry instruction, the method further comprises steps of:
reading disc specification information from a Lead-in Area of the disc held in the disc burner, wherein the disc sequentially has the Lead-in Area, a Data area, a Middle Area and an Outer Drive Area from an innermost ring of the disc to an outermost ring of the disc; and
obtaining a start physical sector number of the Data Area of the disc.

3. The method as claimed in claim 2, wherein the wobble signals begin to be detected at a last physical sector of the Data Area of the disc.

4. The method as claimed in claim 3, wherein the outermost-edge wobble signal is defined as a last wobble signal at a last physical sector of the Outer Drive Area of the disc.

\* \* \* \* \*